United States Patent [19]

Schminke et al.

[11] 4,286,974
[45] Sep. 1, 1981

[54] COMPOUND PARTICLE SEPARATOR

[75] Inventors: Heinz Schminke, Egelsbach; Josef Schindling, Frankfurt am Main 80, both of Fed. Rep. of Germany

[73] Assignee: Metallgesellschaft Aktiengesellschaft, Frankfurt am Main, Fed. Rep. of Germany

[21] Appl. No.: 118,794

[22] Filed: Feb. 5, 1980

[30] Foreign Application Priority Data

Feb. 23, 1979 [DE] Fed. Rep. of Germany ....... 2907081

[51] Int. Cl.³ .......................... B03C 3/01; B01D 50/00
[52] U.S. Cl. ........................................ 55/126; 55/129; 55/315; 55/347; 55/348
[58] Field of Search ................. 55/126, 129, 300, 315, 55/347, 348, 450

[56] References Cited

U.S. PATENT DOCUMENTS

| 2,323,707 | 7/1943 | Danz | 55/347 |
| 2,708,008 | 5/1955 | Hedberg et al. | 55/126 X |
| 2,708,486 | 5/1955 | Hedberg | 55/126 X |
| 2,712,858 | 7/1955 | Wintermute | 55/126 X |
| 2,713,920 | 7/1955 | Phyl | 55/126 X |
| 2,976,130 | 3/1961 | Hedberg et al. | 55/348 X |
| 3,074,219 | 1/1963 | Phyl et al. | 55/348 |
| 3,425,189 | 2/1969 | Haselmayer | 55/129 |
| 3,447,289 | 6/1969 | Pegg | 55/300 |

FOREIGN PATENT DOCUMENTS 1029878 6/1953 France ....................................... 55/348

Primary Examiner—Kathleen J. Prunner
Attorney, Agent, or Firm—Karl F. Ross

[57] ABSTRACT

A compound particle separator, e.g. for removing dust particles from flue gases comprises a horizontal flow electrostatic precipitator whose inlet side is provided with a centrifugal separator assembly comprising a plurality of centrifugal separator cells with at least the gas outlets of the cells lying above the electrostatic precipitator as to the row of such cells closest to the latter. This arrangement improves the distribution of gas to the electrostatic precipitator.

4 Claims, 4 Drawing Figures

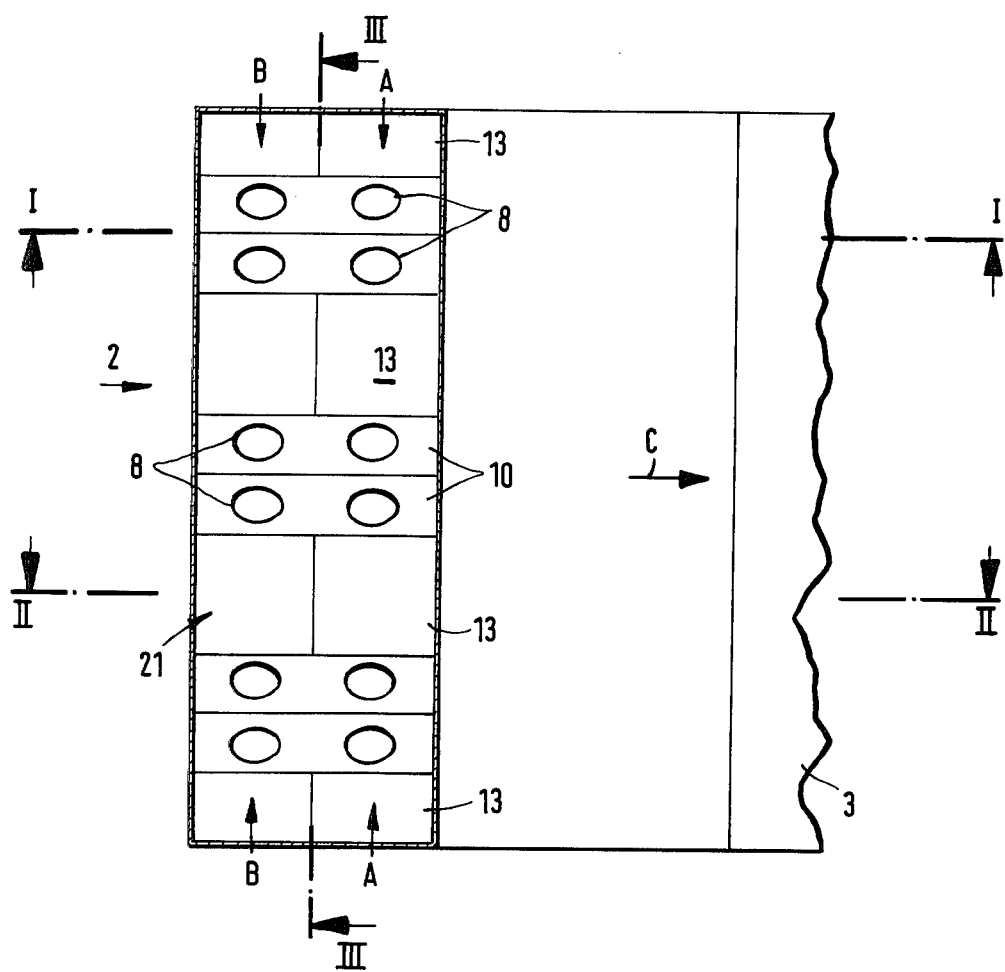

COMPOUND PARTICLE SEPARATOR

FIELD OF THE INVENTION

Our present invention relates to a compound particle separator for removing solid particles from a gas stream and, more particularly, to a dust-collecting plant for the cleaning of exhaust (combustion) gases by a dry process.

BACKGROUND OF THE INVENTION

In the removal of dust from exhaust gases, e.g. of power plants, industrial processes, boilers and metallurgical and chemical plants, a variety of techniques have been used for the dry recovery of the dust or particles.

Briefly the following techniques may be mentioned: Dust removal from a gas stream by filters traversed by the gas and upon which the particulates collect, e.g. in bag or stacked filters. Such systems have the disadvantage that, as the dust collects, the pressure drop becomes more pronounced until the filters may be completely blocked. Direction-change or sedimentation-type units employ the principles that the kinetic energy of the dust particles or the momentum thereof may allow these particles to be collected against a surface upon a direction change in the gas stream, induced by baffles, or as a result of sudden decrease in the velocity of the gas stream. Such systems are effective primarily for larger particles and have poor energy efficiency.

Another technique utilizes centrifugal principles and typical of the units for separating dust by this process are cyclones and vertical-flow centrifugal separators. Such units provide means for imparting a swirl or rotary movement to the gas stream entraining the particles and centrifugally cast the particles outwardly while removing a somewhat cleaned gas from the center of the swirl pattern. Such arrangements are effective for larger particles and have only limited effectiveness for the fines which continue to be entrained by the gas when the original particle-size spectrum covers a wide range.

Finally, mention can be made of electrostatic filters which are highly effective for the removal of fines from a gas stream but may be excessively loaded by large masses of dust in the gas. In an electrostatic filter, for example, of the horizontal flow type, collector electrode plates are arranged as vertical walls defining flow passages between them, these flow passages being formed with arrays of corona-discharge electrodes which apply an electrostatic potential to the dust particles such that the latter are attracted to and collect upon the collector electrodes from which they are dislodged by rapping to allow the dust to fall into a collector bin below the electrode array.

Obviously no one dust collection technique can be effective for all purposes and to provide a minimum pressure drop, high degree of dust removal, effectiveness for large particles as well as the fines, and cost efficiency.

Thus, in many instances combinations of these techniques have been used.

For example, it has already been proposed to provide a compound separator which includes a centrifugal separator arrangement at the inlet side of horizontal flow electrostatic precipitator, the centrifugal separator having a multiplicity of dust-separating cells (see U.S. Pat. No. 2,713,920).

A dust-collecting plant of this type can be used to collect dust from industrial exhaust gases which can have a high dust content. As alluded to earlier, the centrifugal separator unit upstream of the electrostatic precipitator removes such of the coarse particle fraction, if not all of it, thereby decreasing the load on the electrostatic precipitator so as to enable the latter to operate more effectively in the removal of the fines.

A preliminary dust collection apart from the electrostatic precipitator is also advantageous if the coarse particles predominantly consist of useful or reusable materials while the fines are less usable. For instance, flue gases from a furnace which contain residual fuel dust, e.g. a furnace fired by coke particles or coal particles, generally has a particle spectrum such that the coarse particles are predominantly residual fuel while the fine particles are combustion products. In this case, the preliminary dust collection of the coarser particles allows the recovery of the fuel which can be recycled to the furnace or to the process from which the gas derives.

Such preliminary collection of a portion of the entrained particles is also advantageous where the initially collected fraction contains a significant proportion of the more abrasive particles since these abrasive particles tend to scrape fines which may have collected in the electrostatic precipitator from the electrodes thereof and reentrain these particles with the gas by reason of the sandblasting effect of such particles.

In the prior art system described and, in general where compound separators are provided, it is customary to arrange the preliminary filter or collector as a separate unit which is connected by duct work with the horizontal flow electrostatic precipitator.

To ensure an effective distribution of the incoming gas to the electrostatic precipitator, the inlet of the latter is flared from this duct outwardly toward the electrode array and baffles or the like may be provided. As a consequence, the structural steel which is required for the compound dust-collecting plant is considerable, the spatial requirements are great and the overall cost may be excessive without any significant recompense in improved efficiency.

OBJECTS OF THE INVENTION

It is the principal object of the present invention to provide an improved compound dust separator or dust-collecting plant which is structurally simple, of comparatively low cost, and of high efficiency.

Yet another object of this invention is to improve a compound dust collector of the type described such that the centrifugal separator can be located more closely to the electrostatic precipitator than has heretofore been the case.

SUMMARY OF THE INVENTION

According to the invention these objects are attained in a compound separator plant having a horizontal-flow electrostatic precipitator with an inlet side and a centrifugal separator connected with this inlet side, by providing the centrifugal separator with at least one and preferably two or more horizontal rows of dust-collecting cells with respective axes in parallel relationship and perpendicular to the direction of flow of gas through the electrostatic precipitator.

According to an essential feature of the invention, the gas inlets of the cells in the row closest to the electrostatic precipitator (and preferably the outlets as well), at least, are disposed above the electrostatic precipitator, the direction of gas flow through the cells being downward and substantially vertical. Naturally, the gas inlets of the cells of other rows may also be located with advantage above the electrostatic precipitator. However, it is also possible to arrange each row of cells at a slightly different level to have staggered rows. In this case the row closest to the electrostatic precipitator is the uppermost row of cells.

According to the invention, important parts of the centrifugal separator unit are disposed above the electrostatic precipitator and are of simple design so that a rather uniform distribution of gas to the electrostatic precipitator is achieved with a minimum pressure drop.

According to another feature of the invention, the row or rows of dust-collecting cells have the same width as the electrostatic precipitator, i.e. within each row an array of horizontally spaced cells is provided, the whole array having a width equal to the width or horizontal dimension of the inlet side of the electrostatic precipitator.

Each centrifugal separator is provided with an upright tubular housing having an intake side or inlet portion provided with vanes for imparting a swirl to the portion of the gas distributed at this cell, and an outlet tube which is disposed coaxially with the cylindrical or collecting tube but is of smaller diameter and is disposed close to the bottom of this collecting tube.

The gases which pass through the outlet tubes, while entraining fines which are not centrifugally removed in the cells, can be referred to below as "pure" gas since much of the particulate content has been removed. The swirl in the gas entering the collecting tube induces an outward movement of the particles because of their higher mass or density so that the central zone from which the "pure" gas is collected has a reduced particle content. The particles collect along the inner wall of the collecting tube and fall into bins provided at the bottom thereof.

According to another feature of the invention, the outlet tube of each gas cell opens into a pocket-like generally triangular well or shaft which, in turn, communicates over substantially its full cross section with the intake side of the electrostatic precipitator and thus guides the coarsely purified gas from its vertical flow direction to a flow with a significant horizontal component in the direction of the electrostatic precipitator.

Each of the triangular gas wells or shafts has an inclined wall intercepting the downwardly moving gas and deflecting it in part horizontally to provide this component.

These guide plates or walls subdivide the flow space at the inlet and thus provide an initial gas distribution over the full height of the electrostatic precipitator.

According to yet another feature of this invention, dust chutes are provided between the triangular gas wells or shafts to deflect the dust dropping from the walls of the collector tubes downwardly into the dust bin and prevent transfer of dust to the electrostatic precipitator. These dust chutes are downwardly inclined to limit the tendency of dust to adhere to them and the triangular wells have an upwardly converging coping, gable or roof shape to deflect the dust away from them and prevent accumulation.

In yet another feature of the invention the dust collecting cells can be provided with rapping mechanisms of the type commonly used in electrostatic precipitators for preventing adhesion of dust thereto.

BRIEF DESCRIPTION OF THE DRAWING

In the drawing:

FIG. 4 is a horizontal sectional view taken on line IV—IV in FIGS. 1 and 2 and showing the centrifugal separator.

SPECIFIC DESCRIPTION

The main components of the dust-collecting plant are a raw gas inlet 1, a centrifugal separator 2 and a succeeding electrostatic precipitator 3. The centrifugal separator comprises a multitude of tubular dust-collecting cells 4, which are arranged in two horizontal rows A and B. As is particularly apparent from FIG. 4, the rows A and B extend at right angles to the direction of gas flow (arrow C) at the inlet of the electrostatic precipitator. The number of dust-collecting cells and the number of rows of such cells may be selected as desired, mainly in view of economical considerations.

Figure 3:
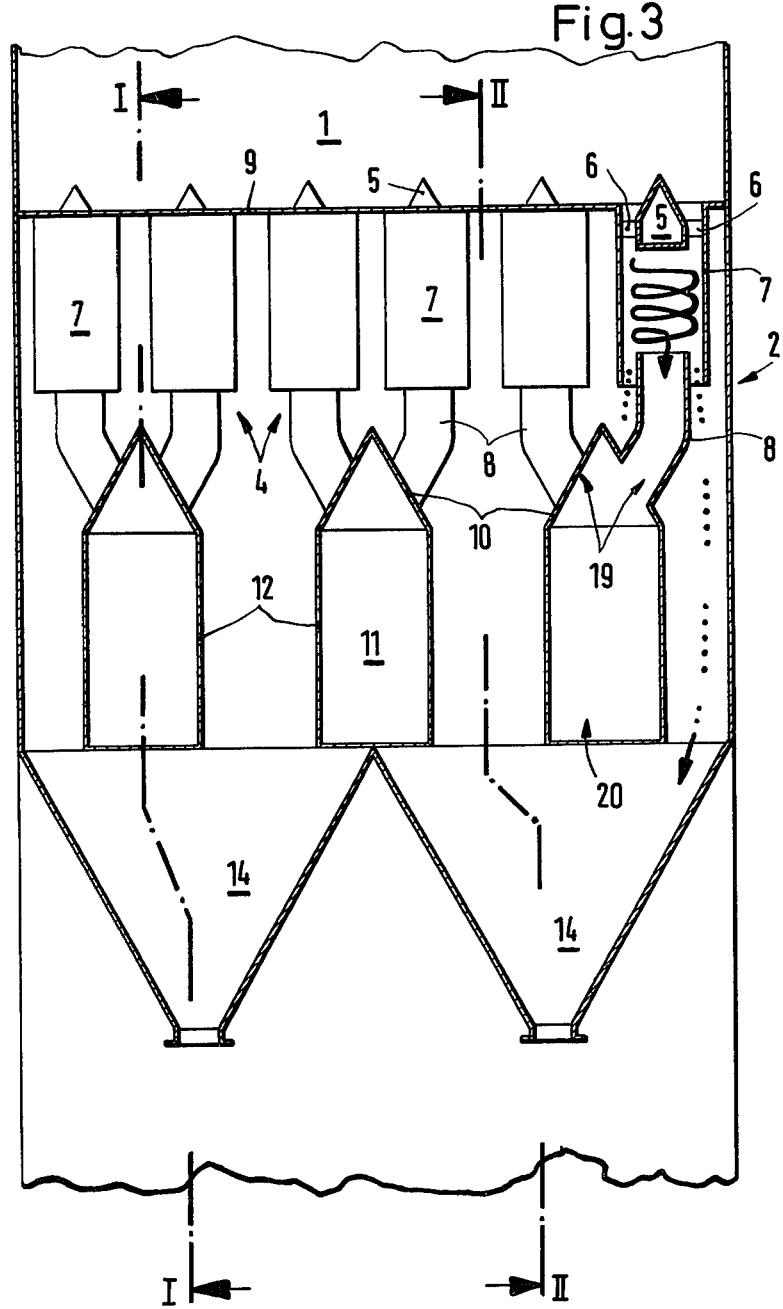
FIG. 3 is a vertical sectional view taken on a plane (line III—III in FIGS. 1, 2 and 4) which is at right angles to the direction of flow in the electrostatic precipitator.

FIG. 3 is a longitudinal sectional view showing a single dust-collecting cell. Near the raw gas inlet, the cell has an approximately conical displacement body 5, which is surrounded by an annular series of inclined guide vanes 5, which impart to the inflowing raw gas a swirl about a vertical axis. Having a higher specific gravity, the dust is thrown against the inside surface of the vertical dust-collecting tube 7 as a result of said swirl and the pure gas which has been freed from most of the dust is conducted through the pure gas tube 8, which is somewhat curved. An intermediate bottom 9 is provided on the level of the inlet openings of the dust-collecting tubes 7 and prevents a downward flow of gas past the dust-collecting cells 4.

Figure 2:
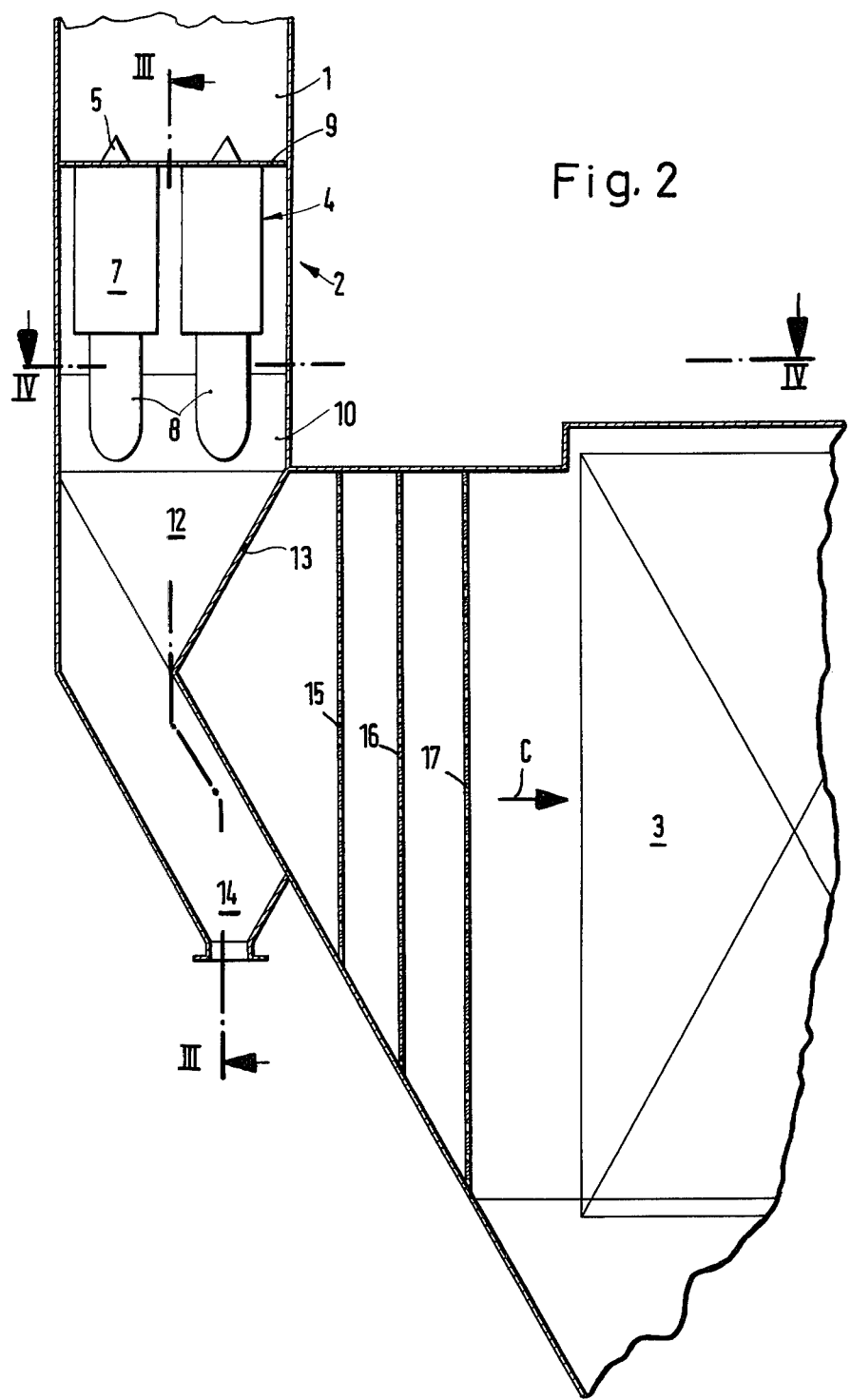
FIG. 2 is a vertical section view which is similar to that of FIG. 1 and taken on line II—II in FIGS. 3 and 4.

Each pure gas tube 8 opens through a roof-shaped top cover 10 of a pure gas well 11. As is best apparent from FIG. 2, each of the two vertical side walls 12 of each pure gas well 11 has the configuration of an inverted triangle. The horizontal distance between adjacent pure gas wells 11 (see FIG. 3) is approximately as large as the width of each well. Inclined dust chutes 13, which are best apparent in FIGS. 2 and 4, are disposed outside the array of the pure gas wells and between the side walls 12 thereof. Dust coming from the dust-collecting cells 4 (see also FIG. 3) slides down along said dust chutes 13 and falls into the dust bins 14.

Figure 1:
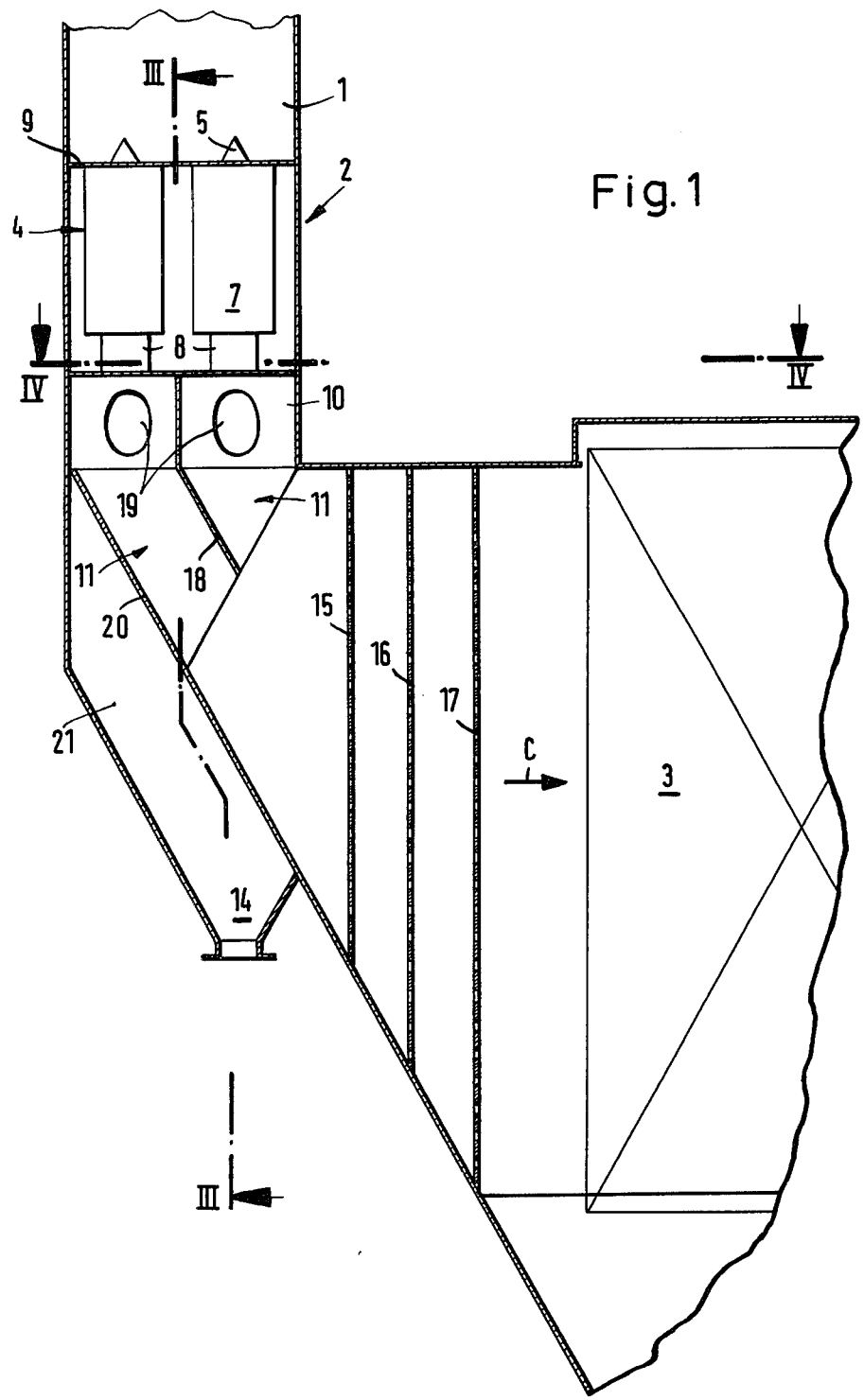
FIG. 1 is a vertical section which shows the dust-collecting apparatus and is taken on a plane (line I—I in FIGS. 3 and 4) that is approximately parallel to the direction of gas flow.

The pure gas leaves the pure gas well 11 through its open outlet side and first flows through three perforated metal plates 15, 16, 17 before entering the electrostatic precipitator 3 in the direction of arrow C (see FIGS. 1,2,4).

To promote a uniform vertical distribution of the gas, each pure gas well 11 has a guide plate 18, which is shown in FIG. 1 and prevents gas from the pure gas well 11 from flowing mainly in a downward direction because in that case the upper portion of the electrostatic precipitator would be flown through at an inadequate rate. The perforated metal plates 15 to 17 promote also a uniform distribution of the gas flow.

The length of the pure gas tubes 8 of the dust-collecting cells is desirably 1 to 2 times the diameter of said tubes. FIG. 1 shows the openings 19 of two pure gas tubes 8 in the roof-shaped top cover 10 of a pure gas well 11. It is also apparent from FIG. 1 that the space 21 between the inclined rear walls 20 of the pure gas wells and the inlet of the dust bin 14 is so large that a person can walk in said space for maintenance work.

We claim:

1. A compound dust-collecting plant comprising:
   a horizontal-flow electrostatic precipitator having an intake side; and
   a centrifugal separator mounted at said intake side of said electrostatic precipitator and including:
   a downwardly extending raw gas inlet,
   at least one horizontal row of a multiplicity of spaced apart centrifugal-separator cells disposed in said raw gas inlet and traversed downwardly and substantially vertically by a dust entraining raw gas, each of said cells including:
   a vertical collecting tube with a respective upper gas inlet opening,
   in said vertical tube near said inlet opening vane means for imparting a swirl to the gas traversing same, said inlet openings being disposed above said electrostatic precipitator, and
   an outlet tube coaxial with and disposed within said collecting tube proximal to the bottom thereof,
   the lower end of each two adjacent outlet tubes being connected to a respective gas well having a pocket-like construction, each of said gas wells having
   two vertical triangular side walls,
   a roof-shaped top cover, and
   an open outlet side near the inlet of the electroatatic precipitator;
   an inclined dust chute disposed below the collecting tubes and between side walls of adjacent gas wells; and
   a dust-collecting bin below the dust chutes, the horizontal distance between said wells being approximately equal to the width of each well.

2. The plant defined in claim 1 wherein a plurality of rows of such cells in horizontally spaced relationship is provided in said raw gas inlet.

3. The plant defined in claim 1 wherein said row has the same horizontal width as said electrostatic precipitator.

4. The plant defined in claim 1, claim 2 or claim 3, further comprising a plurality of vertically disposed perforated plates between said centrifugal separator and said electrostatic precipitator.

* * * * *